US012766490B2

(12) United States Patent
Zhou et al.

(10) Patent No.: US 12,766,490 B2
(45) Date of Patent: Oct. 20, 2026

(54) HIGH TEMPERATURE METHANOL STEAM REFORMING CATALYST

(71) Applicant: CLARIANT INTERNATIONAL LTD, Muttenz (CH)

(72) Inventors: Yunyun Zhou, Sellersburg, IN (US); Jason Spencer, Corydon, IN (US); Brooke Ames, La Grange, KY (US); Yeping Cai, Louisville, KY (US)

(73) Assignee: CLARIANT INTERNATIONAL LTD, Muttenz (CH)

( * ) Notice: Subject to any disclaimer, the term of this patent is extended or adjusted under 35 U.S.C. 154(b) by 612 days.

(21) Appl. No.: 18/200,001

(22) Filed: May 22, 2023

(65) Prior Publication Data

US 2023/0398520 A1 Dec. 14, 2023

Related U.S. Application Data

(60) Provisional application No. 63/350,735, filed on Jun. 9, 2022.

(51) Int. Cl.

| | |
|---|---|
| ***B01J 23/06*** | (2006.01) |
| ***B01J 23/00*** | (2006.01) |
| ***B01J 23/80*** | (2006.01) |
| ***B01J 35/30*** | (2024.01) |
| ***B01J 37/03*** | (2006.01) |

(Continued)

(52) U.S. Cl.

CPC ............. *B01J 23/80* (2013.01); *B01J 23/005* (2013.01); *B01J 23/06* (2013.01); *B01J 35/394* (2024.01); *B01J 37/031* (2013.01); *B01J 37/088* (2013.01); *C01B 3/326* (2013.01); *H01M 8/0618* (2013.01); *B01J 2235/15* (2024.01); *C01B 2203/0233* (2013.01); *C01B 2203/066* (2013.01);

(Continued)

(58) Field of Classification Search

CPC . B01J 23/80; B01J 23/005; B01J 23/06; B01J 35/394; B01J 37/031; B01J 37/088; B01J 2235/15; C01B 3/326; C01B 2203/0233; C01B 2203/066; C01B 2203/1076; C01B 2203/1082; C01B 2203/1223; H01M 8/0618

USPC .......................................................... 502/342

See application file for complete search history.

(56) References Cited

U.S. PATENT DOCUMENTS 4,913,842 A * 4/1990 Yoneoka ................ C01B 3/323
252/373

5,635,439 A 6/1997 Fukui (Continued)

FOREIGN PATENT DOCUMENTS

CN 1562472 1/2005
CN 102145281 8/2011

(Continued)

OTHER PUBLICATIONS

Chem. Rev. 2007, 107, 3992-4021.

*Primary Examiner* — Cam N. Nguyen

(57) ABSTRACT

The present disclosure relates generally to a methanol reforming catalyst composition comprising a ZnO phase, present in the composition in an amount of 20-75 wt. %; a zinc-aluminum spinel phase, present in the composition in an amount of 20-60 wt. %; and a Cu dopant phase, present in the composition in an amount of 0.1-20 wt. %. In various embodiments, the methanol reforming catalyst can achieve (Continued)

stable high methanol conversion rates and high hydrogen production rates at high temperatures (>300° C.).

15 Claims, 2 Drawing Sheets

(51) Int. Cl.
*B01J 37/08* (2006.01)
*C01B 3/326* (2026.01)
*H01M 8/0612* (2016.01)

(52) U.S. Cl.
CPC ................. *C01B 2203/1076* (2013.01); *C01B 2203/1082* (2013.01); *C01B 2203/1223* (2013.01)

(56) References Cited

U.S. PATENT DOCUMENTS

| | | | | | |
|---|---|---|---|---|---|
| 6,114,279 | A * | 9/2000 | Fukui | C07C 29/154 | 502/343 |
| 6,218,335 | B1 * | 4/2001 | Okada | C01G 53/82 | 501/118 |
| 6,576,217 | B1 | 6/2003 | Nojima | | |
| 6,583,084 | B2 | 6/2003 | Konosuke | | |
| 6,589,909 | B2 | 7/2003 | Yoshimura | | |
| 6,627,572 | B1 * | 9/2003 | Cai | B01J 23/80 | 502/343 |
| 6,664,207 | B2 * | 12/2003 | Yao | C07C 29/154 | 502/67 |
| 6,844,292 | B1 * | 1/2005 | Okada | B01J 23/80 | 502/342 |
| 6,864,215 | B2 * | 3/2005 | Dodwell | B01J 20/106 | 502/414 |
| 6,919,066 | B2 * | 7/2005 | Holzle | C01B 3/326 | 252/373 |
| 6,930,068 | B2 | 8/2005 | Kaneko | | |
| 6,951,635 | B2 * | 10/2005 | Gangwal | B01J 20/08 | 502/514 |
| 7,025,947 | B2 | 4/2006 | Suzuki | | |
| 7,064,097 | B1 * | 6/2006 | Cai | B01J 35/60 | 502/343 |
| 7,128,769 | B2 | 10/2006 | Renn | | |
| 7,387,983 | B2 * | 6/2008 | Holzle | B01J 37/18 | 502/343 |
| 7,749,376 | B2 * | 7/2010 | Turbevillle | B01J 23/80 | 208/299 |
| 7,964,114 | B2 * | 6/2011 | Chen | C01B 3/16 | 502/343 |
| 7,998,897 | B2 | 8/2011 | Christian | | |
| 8,119,099 | B2 * | 2/2012 | Schiodt | B01J 23/005 | 423/655 |
| 8,399,718 | B2 * | 3/2013 | Wang | C07C 29/141 | 502/343 |
| 9,174,199 | B2 | 11/2015 | Zhang | | |
| 9,545,619 | B2 * | 1/2017 | Wang | C07C 5/03 | |
| 10,464,049 | B2 | 11/2019 | Faure | | |
| 10,941,038 | B2 * | 3/2021 | Krøll | B01J 23/06 | |
| 11,027,984 | B2 * | 6/2021 | Speth | C01C 1/0488 | |
| 11,124,423 | B2 * | 9/2021 | Speth | C01B 3/52 | |
| 2009/0297434 | A1 | 12/2009 | Wang | | |
| 2022/0250043 | A1 | 8/2022 | Singh | | |
| 2025/0367643 | A1 * | 12/2025 | Garcia-Dieguez | B01J 37/0236 | |

FOREIGN PATENT DOCUMENTS

| | | |
|---|---|---|
| CN | 104741128 | 7/2015 |
| CN | 108855065 | 11/2018 |
| EP | 1077081 | 2/2001 |
| EP | 3254760 | 12/2017 |
| JP | H0427434 | 1/1992 |
| JP | 2001096158 | 4/2001 |
| JP | 2003265961 | 9/2003 |
| JP | 2003275590 | 9/2003 |
| JP | 2004321924 | 11/2004 |
| JP | 2012139637 | 7/2012 |
| JP | 2014524836 | 9/2014 |
| WO | 2008126743 | 10/2008 |
| WO | 2022112310 | 6/2022 |

* cited by examiner

HIGH TEMPERATURE METHANOL STEAM REFORMING CATALYST

CROSS-REFERENCE TO RELATED APPLICATIONS

This application claims priority to U.S. Provisional Patent Application Ser. No. 63/350,735 filed Jun. 9, 2022, which is incorporated herein by reference in its entirety.

FIELD OF THE DISCLOSURE

The present disclosure relates generally to methanol steam reforming catalyst materials. More particularly, the present disclosure relates to spinel-based catalysts useful in high temperature methanol steam reforming reactions, to methods of making such catalysts, and to methods for forming hydrogen from methanol with such catalysts.

TECHNICAL BACKGROUND

Hydrogen fuel cells are one of the most promising new clean technologies for producing electricity. This technology currently attracts growing attention due to its energy efficiency and environmental benefits. However, storing and transporting hydrogen remains challenging because of insufficient storage capacity and safety concerns. As such, there is a need for alternative sources of hydrogen that overcome these storage and transportation issues.

One such alternative is to use methanol to produce hydrogen on-site via methanol steam reforming. Methanol steam reforming can reduce or even eliminate the necessity of hydrogen storage and transportation operations. As compared to hydrogen, methanol storage and transportation is much more cost-efficient and safe. Methanol is also a desirable precursor candidate for hydrogen production as compared to methane and other alcohols. It has a high hydrogen content, which theoretically results in three moles of hydrogen generation from one mole of methanol upon steam reforming. And lastly, methanol can be produced from biomass, which greatly reduces the carbon footprint, making the methanol steam reforming process more environmentally sustainable. Thus, methanol steam reforming provides a desirable alternative for supplying hydrogen to fuel cells used in stationary power systems and mobile applications.

Methanol steam reforming is conventionally operated at either low (less than 300° C.) or high temperatures (at least 300° C.). Because the reaction is endothermic (Equation 1), reforming reactions are desirably run under higher temperatures to achieve higher $H_2$ yield.

$$CH_3OH + H_2O \rightarrow 3H_2 + CO_2,\ \Delta H_{298K} = 49.3\ \text{kJ/mol} \quad (1)$$

It has been reported that $H_2$ selectivity could reach 75% under favorable conditions. Thus, it is advantageous to have methanol steam reforming catalysts that can withstand high temperature conditions to achieve high methanol conversion. Steam reforming processes, of course, require a catalyst that is suitable to their particular conditions, which can be an especially rigid requirement for high temperature processes.

A variety of catalysts have been developed to accommodate specific methanol steam reforming reaction conditions. Conventionally, the most common catalysts used in methanol steam reforming and methanol synthesis are based on copper and metals from the VIIIB-group (see e.g., Chem. Rev. 2007, 107, 3992-4021). Copper-based catalysts are not only active and selective towards $H_2$ but are also stable at reaction temperatures below 300° C. However, copper catalysts, for example, the commercially-available CuO—ZnO/$Al_2O_3$ catalysts, tend to sinter rapidly at temperatures in excess of 280° C., and are highly sensitive towards condensing steam, sulfur, and chloride, as well as coke deposition. Their pyrophoric nature when exposed to air is also problematic. To address these problems, rare earth oxides, $Cr_2O_3$ and $ZrO_2$ have been used as carrier or support materials to increase dispersion of copper active species and to decrease sintering during reaction. Another popular route to improve CuO—ZnO catalyst formulations is to add promoters, such as Ce, La, Ba, Mg, Co, Fe, etc. (see e.g., EP1077081A2, CN104741128, JP2003265961A).

Unlike copper-based catalysts, palladium/zinc or platinum/zinc alloy catalysts tend to be more stable at high temperatures, e.g., >350° C., but exhibit relatively lower activity. Together with the high price of noble metal cost, palladium/zinc or platinum/zinc catalysts have much lower potential in commercial applications (see e.g., WO2010138483A2). U.S. Patent Application Publications nos. 2001/0021469A1 and 2002/0039965A1 reported that PdZnZr and Pd/Pt—CuZn catalysts suffered from deactivation at high temperatures as well, and that zinc leaching was observed in the PdZnZr catalyst during reforming. Another class of popular high-temperature methanol steam reforming catalyst is chromium/zinc catalysts. They display excellent activity, selectivity and stability at elevated temperatures. However, chromium's toxicity and carcinogenicity make these catalysts more and more undesirable for industrial use as countries around the globe increase their environmental protection efforts. Other catalysts such as CuZr, NiZr, AgY, NiZn, AuHf, etc. have been used for low temperature applications, but are not suitable for high temperature reforming reactions (see e.g., U.S. Pat. No. 5,635,439A).

Therefore, there remains a need for methanol steam reforming catalysts that are active and sustainable at high temperatures, cost-efficient and environmentally benign. The present inventors have developed a methanol reforming catalyst that operates at high temperatures while maintaining its catalytic activity.

SUMMARY

The present inventors have determined that a catalyst based on a zinc-aluminum spinel phase with a low amount of copper dopant can provide high-temperature activity and stability at low cost and without the negative environmental impact of using significant amounts of chromium. Accordingly, one aspect of the disclosure provides a methanol reforming catalyst composition comprising:

- a ZnO phase, present in the composition in an amount of 20-75 wt. %;
- a zinc-aluminum spinel phase, present in the composition in an amount of 20-60 wt. %; and
- a Cu dopant, present in the composition in an amount of 0.1-20 wt. %.

In various embodiments, the catalyst composition has low to no amounts of any crystalline $Al_2O_3$ phase.

Another aspect of the disclosure provides a calcined methanol reforming catalyst composition comprising: oxides of Zn, Al, and Cu, wherein:

- Zn is present in the composition in a total amount of 40-80 wt % (e.g., 60-80 wt. %), calculated as ZnO;

Al is present in the composition in a total amount of 20-50 wt. % (e.g., 20-40 wt. %), calculated as $Al_2O_3$; and Cu is present in the composition in a total amount of 0.5-25 wt. % (e.g., 1-15 wt. %), calculated as CuO, wherein the catalyst composition comprises at least 20 wt. % (e.g., at least 30 wt. %, or at least 40 wt. %) zinc-aluminum spinel, as determined by XRD and calculated as $ZnAl_2O_4$.

Another aspect of the disclosures provides a method for preparing a methanol reforming catalyst composition as described herein. The method includes comprising:

providing an aqueous precursor solution comprising zinc ions, aluminum ions, and copper ions;

precipitating a solid catalyst precursor comprising salts of zinc, aluminum and copper from the aqueous precursor solution; and then calcining the solid catalyst precursor to provide the catalyst composition.

Another aspect of the disclosure provides a method for performing a methanol reforming reaction, comprising contacting a feed comprising water and methanol with a methanol reforming catalyst composition as described herein at a temperature of at least 300° C. to form hydrogen and carbon dioxide.

DETAILED DESCRIPTION

Figure 1:
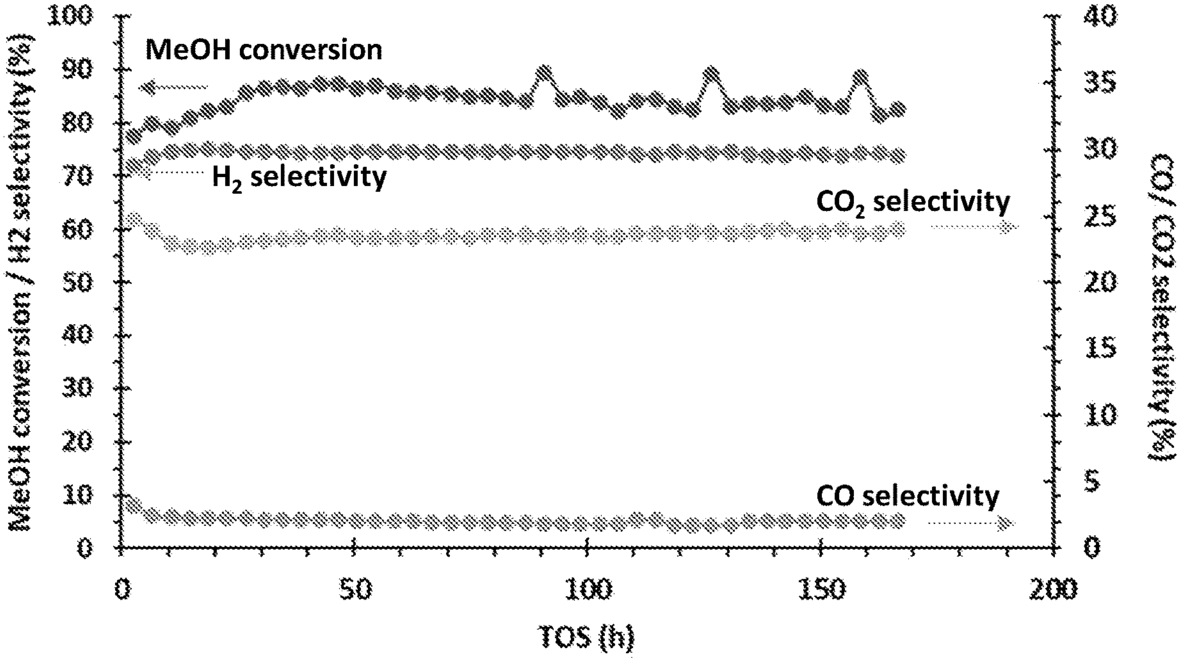
FIG. 1. illustrates methanol conversion, hydrogen selectivity, carbon monoxide selectivity, and carbon dioxide selectivity as a function of test duration for a catalyst as described herein.

The present disclosure is concerned with methanol reforming catalyst compositions that include zinc, aluminum, oxygen, and copper. The disclosure demonstrates that such catalysts, which can advantageously be substantially free of chromium, can exhibit activity comparable to or higher than conventional methanol reforming catalysts. The disclosure demonstrates that such catalysts can, in various embodiments, operate at higher temperatures relative to catalysts prepared according to conventional methods.

In various advantageous aspects and embodiments of the compositions as otherwise described herein, zinc is present in the form of ZnO. In various advantageous aspects and embodiments of the compositions as otherwise described herein, the zinc, aluminum, and oxygen together form a zinc-aluminum spinel crystalline structure. Advantageously, the present inventors have determined that incorporation of copper into the methanol reforming catalyst can provide improved catalyst activity. Accordingly, in various embodiments as otherwise described herein, the materials of the disclosure include a Cu dopant. The present inventors have determined that the inclusion of copper can advantageously provide good catalytic activity and stability at high temperatures.

Accordingly, one aspect of the disclosure is a methanol reforming catalyst composition. The catalyst composition includes a ZnO phase, present in an amount of 20-75 wt. %, a zinc-aluminum spinel phase, present in the composition in an amount of 20-60 wt. %, and a Cu dopant, present in the composition in an amount of 0.1-20 wt. %. Amounts of such phases are determined using x-ray diffraction, using the Rietveld refinement.

As noted above, a ZnO phase is present in the composition of this aspect in an amount within the range of 20-75 wt. %. The amount of the ZnO phase in the catalyst composition of the disclosure can vary within this range. For example, in various embodiments as otherwise described herein, the ZnO phase is present in an amount within the range of 20-70 wt. %, e.g., in the range of 20-65 wt. %, or 20-60 wt %, or 20-55 wt %, or 20-50 wt. %, or 20-45 wt. %, or 20-40 wt. %. In various embodiments as otherwise described herein, the ZnO phase is present in the composition within the range of 25-75 wt. %, e.g., in the range of 25-70 wt %, or wt %, or 25-60 wt %, or 25-55 wt. %, or 25-50 wt. %, or 25-45 wt. %, or 25-40 wt. %. In various embodiments as otherwise described herein, the ZnO phase is present in the composition in the range of 30-75 wt %, or 30-70 wt %, or 30-65 wt %, or 30-60 wt. %, or 30-55 wt. %, or 30-50 wt. %, or 30-45 wt. %, or 30-40 wt. %. In various embodiments as otherwise described herein, the ZnO phase is present in the composition within the range of 35-75 wt. %, e.g., in the range of 35-70 wt %, or 35-65 wt %, or 35-60 wt %, or 35-55 wt. %, or 35-50 wt. %, or wt. %, or 35-40 wt. %. In various embodiments as otherwise described herein, the ZnO phase is present in the composition within the range of 40-75 wt. %, e.g., in the range of 40-70 wt %, or 40-65 wt %, or 40-60 wt %, or 40-55 wt. %, or 40-50 wt. %.

In various embodiments as otherwise described herein, the ZnO phase in the composition as otherwise described herein has an average crystallite size of 1-50 nm. For example, in various embodiments, the ZnO phase has an average crystallite size of 1-45 nm, e.g., of 1-40 nm, or 1-35 nm, or 1-30 nm. In various embodiments, the ZnO phase has an average crystallite size of 2-50 nm, e.g., of 2-45 nm, or 2-40 nm, or 2-35 nm, or 2-30 nm. In various embodiments, the ZnO phase has an average crystallite size of 5-50 nm, e.g., of 5-45 nm, or 5-40 nm, or 5-35 nm, or 5-30 nm. As would be appreciated by the person skilled in the art, a smaller crystallite size correlates to a higher surface area. Having a higher surface area provides a greater total catalytic area for the methanol steam reforming reaction to occur, leading to an overall higher catalytic activity.

As noted above, zinc-aluminum spinel phase is present in the composition of this aspect in an amount of 20-60 wt. %. In various embodiments as otherwise described herein, the zinc-aluminum spinel phase is present in the composition in an amount within the range of 20-55 wt. %, e.g. in the range of 20-50 wt. %, or 20-45 wt. %, or 20-40 wt. %, or 20-35 wt. %. In various embodiments as otherwise described herein, the zinc-aluminum spinel phase is present in the composition in an amount within the range of 25-60 wt. %, e.g., in the range of 25-55 wt. %, or 25-50 wt. %, or 25-45 wt. %, or 25-40 wt. %, or 25-35 wt. %.

In various embodiments, the zinc-aluminum spinel phase of the composition as described herein has an average crystallite size in the range of 1-100 nm. The average crystallite size of the zinc-aluminum spinel phase of the compositions described herein can vary. For example, in various embodiments the zinc-aluminum spinel phase has an average crystallite size of 1-75 nm, e.g., or 1-50 nm. In various embodiments, the zinc-aluminum spinel phase has an average crystallite size of 2.5-100 nm, e.g. or 2.5-75 nm, or 2.5-50 nm. In various embodiments, the zinc-aluminum spinel phase has an average crystallite size of 5-100 nm, e.g. or 5-75 nm, or 5-50 nm. As with the crystallite size of the ZnO phase, having a smaller crystallite size of the zinc-aluminum spinel phase correlated to a higher surface area and provides higher catalytic activity.

As zinc-aluminum spinel itself typically has an idealized chemical formula of $ZnAl_2O_4$, it can be desirable to select a ratio of zinc to aluminum that, together with other elemental components, provides a desired amount of a spinel structure. In various embodiments of the compositions as otherwise described herein, zinc is present in excess of the amount necessary to form a spinel structure, i.e., providing a significant amount of ZnO, as described herein.

As noted above, a Cu dopant is present in the composition according to this aspect of the disclosure in an amount in the range of 0.1-20 wt. %. The amount of the Cu dopant in the composition described herein can also vary. In various embodiments, the Cu dopant is present in the composition in an amount within the range of 0.1-15 wt. %, e.g., in the range of 0.1-10 wt. %. In various embodiments, the Cu dopant is present in the composition in an amount within the range of 0.5-20 wt. %, e.g., in the range of 0.5-15 wt. %, or 0.5-10 wt. %. In various embodiments, the Cu dopant is present in the composition in an amount within the range of 1-20 wt. %, e.g., in the range of 1-15 wt. %, or 1-10 wt. %. The present inventors have determined that only small amounts of copper are necessary for desirable activity and stability, and as such in various embodiments there is no more than 15 wt. % Cu dopant in the material, e.g., no more than 10 wt. % Cu dopant.

In various embodiments the catalyst composition of the disclosure has low to no amounts of a crystalline $Al_2O_3$ phase. For example, in various embodiments, the amount of crystalline $Al_2O_3$ phase in the catalyst composition is no more than 5 wt. %, e.g., no more than 4 wt. %, or no more than 3 wt. %, or no more than 2 wt. %, or no more than 1 wt %. In various embodiments, the catalyst composition includes an $Al_2O_3$ phase in an amount in the range of 1-6 wt. %, or 1-4 wt. %, or 1-3 wt. %, or 1-2 wt %. In various embodiments, the catalyst composition does not include any substantial amount of crystalline $Al_2O_3$ phase, e.g., no more than 0.5 wt %.

In an alternative definition of useful catalyst compositions of the disclosure, the catalyst composition is a calcined methanol reforming catalyst composition comprising oxides of Zn, Al, and Cu, wherein:

- Zn is present in the composition in a total amount of 40-80 wt % (e.g., 60-80 wt. %), calculated as ZnO;
- Al is present in the composition in a total amount of 20-50 wt. % (e.g., 20-40 wt. %), calculated as $Al_2O_3$; and
- Cu is present in the composition in a total amount of 0.5-20 wt. % (e.g., 1-15 wt. %, or 1-wt. %), calculated as CuO,
- wherein the catalyst composition comprises at least 20 wt. % (e.g., at least 30 wt. %, or at least 40 wt. %) zinc-aluminum spinel, as determined by XRD and calculated as $ZnAl_2O_4$.

The catalyst compositions according to this aspect of the disclosure can in various embodiments have features as generally described above with respect to the previous aspect.

In various embodiments of the catalyst compositions of the disclosure, zinc is present in the composition as otherwise described herein in a total amount of 40-80 wt. %, calculated as ZnO. The amount of zinc in the catalyst compositions of the disclosure can vary within this range. For example, in various embodiments as otherwise described herein, zinc is present in the composition in a total amount of 40-75 wt. %, e.g., in a total amount of 40-70 wt. %, or 40-65 wt. %, or 40-60 wt. %, calculated as ZnO. In various embodiments as otherwise described herein, zinc is present in the composition in a total amount of 45-80 wt. %, e.g., in a total amount of 45-75 wt. %, or 45-70 wt. %, or 45-65 wt. %, or 45-60 wt. %, calculated as ZnO. In various embodiments as otherwise described herein, zinc is present in the composition in a total amount of 50-80 wt. %, e.g., in a total amount of 50-75 wt. %, or 50-70 wt. %, or 50-65 wt. %, or wt. %, calculated as ZnO. In various embodiments as otherwise described herein, zinc is present in the composition in a total amount of 55-80 wt. %, e.g., in a total amount of 55-75 wt. %, or 55-70 wt. %, or 55-65 wt. %, or 55-60 wt. %, calculated as ZnO. In various embodiments as otherwise described herein, zinc is present in the composition in a total amount of 60-80 wt. %, e.g., in a total amount of 60-75 wt. %, or 60-70 wt. %, or 60-65 wt. %, calculated as ZnO.

In various embodiments as otherwise described herein, aluminum is present in the composition in a total amount of 20-50 wt. %, calculated as $Al_2O_3$. The amount of aluminum in the catalyst composition of the disclosure can vary within this range. For example, in various embodiments as otherwise described herein, aluminum is present in the composition in a total amount of 20-45 wt. %, e.g., in a total amount of 20-40 wt. %, or 20-35 wt. %, or 20-30 wt. %, calculated as $Al_2O_3$. In various embodiments as otherwise described herein, aluminum is present in the composition in a total amount of 25-50 wt. %, e.g. in a total amount of 25-45 wt. %, or 25-40 wt. %, or 25-35 wt. %, or 25-30 wt. %, calculated as $Al_2O_3$. In various embodiments as otherwise described herein, aluminum is present in the composition in a total amount of 30-50 wt. %, e.g. in a total amount of 30-45 wt. %, or 30-40 wt. %, or 30-35 wt. %, calculated as $Al_2O_3$.

In various embodiments as otherwise described herein, copper is present in the composition in a total amount of 0.5-20 wt. %, calculated as CuO. The amount of copper in the catalyst composition of the disclosure can vary within this range. For example, in various embodiments as otherwise described herein, copper is present in the composition in a total amount of 0.5-15 wt. %, e.g., in a total amount of 0.5-10 wt. %, or 0.5-5 wt. %. In various embodiments as otherwise described herein, copper is present in the composition in a total amount of 1-20 wt %, e.g., 1-15 wt. %, or 1-10 wt. %, or 1-5 wt. %. In various embodiments as otherwise described herein, copper is present in the composition in a total amount of 2-20 wt %, e.g., 2-15 wt. %, or 2-10 wt. %, or 2-5 wt. %.

In various embodiments of the compositions as otherwise described herein, the composition can further include one or more metal species. For example, in various such embodiments, the composition includes one or more of sodium, potassium, magnesium, calcium, lanthanum, cesium, gallium, barium, and zirconium; these typically do not form part of the crystalline spinel. The metal can be provided (e.g., via impregnation) as any compound that otherwise provides the metal (e.g., as an oxide) to the catalyst composition (e.g., before a calcination step). For example, in various embodiments, the metal is provided as a salt selected from a carbonate, nitrate, acetate, formate, oxalate, molybdate and citrate. In various embodiments as otherwise described herein, potassium is provided as a salt, e.g., as a potassium acetate, introduced via impregnation before a calcination step. In various embodiments as otherwise described herein, magnesium is provided as a salt, e.g., as a magnesium acetate, introduced via impregnation before a calcination step. Typically, such metals can be present in the catalyst composition in the form of oxides, generally separate from a crystalline spinel structure.

In various embodiments of the compositions as otherwise described herein, the composition includes only one additional metal species selected from sodium, potassium, magnesium, calcium, lanthanum, cesium, gallium, barium, and zirconium. The person of ordinary skill in the art will, based on the description herein, select one or more appropriate metal species. For example, in various embodiments of the composition as otherwise described herein, the composition includes one or more (e.g., one) metal species selected from sodium, potassium, magnesium, and calcium. In another example, in various embodiments of the composition as described herein, the composition includes one or more (e.g., one) metal species selected from potassium and magnesium. In various embodiments of the compositions as otherwise described herein, the compositions includes a first metal species selected from sodium, potassium, magnesium, calcium, lanthanum, cesium, gallium, barium, and zirconium (e.g., selected from sodium, potassium, magnesium, and calcium) and a second metal species selected from sodium, potassium, magnesium, calcium, lanthanum, cesium, gallium, barium, and zirconium (e.g., selected from sodium, potassium, magnesium, and calcium). For example, in various embodiments, the composition includes a first metal species that is selected from sodium and potassium, and a second metal species selected from magnesium and calcium. In yet another example, in various embodiments of the composition as otherwise described herein, the composition includes potassium as the first metal species and magnesium as the second metal species.

Without intending to be bound by theory, it is believed that the metal species described herein can act as promoters to desirably modify reactivity.

The metal species can be provided in a variety of amounts. For example, various embodiments of the catalyst compositions described herein can include one or more metal species selected from sodium, potassium, magnesium, calcium, lanthanum, cesium, gallium, barium, and zirconium, present in a combined amount of 0.05-20 wt. %. For example, in various embodiments as otherwise described herein, the catalyst composition as described herein can further include one or more of sodium, potassium, magnesium, calcium, lanthanum, cesium, gallium, barium, and zirconium, present in a combined amount of 0.05-15 wt. %, or 0.05-10 wt. %, or 0.05-5 wt. %, or 0.1-20 wt. %, or 0.1-15 wt. %, or 0.1-10 wt. %, or 0.1-5 wt. %, or 0.5-20 wt. %, or 0.5-15 wt. %, or 0.5-10 wt. %, or 0.5-5 wt. %. In various desirable embodiments, the total amount of these metal species is no more than 10 wt. %, e.g., no more than 5 wt. %.

In particular embodiments as described herein, the catalyst composition further comprises at least one of magnesium and potassium. For example, in various embodiments as otherwise described herein, the catalyst further comprises at least one of magnesium, present in an amount of 0.1-2 wt. %, calculated as MgO; and potassium, present in an amount of 0.25-3 wt. %, calculated as $K_2O$. In various embodiments as otherwise described herein, the catalyst further comprises magnesium present in an amount of 0.1-1.5 wt. %, e.g., in an amount of 0.1-1.0 wt. %, or 0.1-0.75 wt. %, or 0.1-0.5 wt. %, calculated as MgO. In various embodiments as otherwise described herein, the catalyst further comprises magnesium present in an amount of 0.25-2.0 wt. %, e.g., in an amount of 0.25-1.5 wt. %, or 0.25-0.75 wt. %, or 0.25-0.5 wt. %, calculated as MgO. In various embodiments as otherwise described herein, the catalyst further comprises magnesium present in an amount of 0.5-2.0 wt. %, e.g., in an amount of 0.5-1.5 wt. %, or 0.5-1.0 wt. %, or 0.5-0.75 wt. %, calculated as MgO. In various embodiments as otherwise described herein, the catalyst further comprises potassium present in an amount of 0.25-2.75 wt. %, e.g. in an amount of 0.25-2.5 wt. %, or 0.25-2.25 wt. %, or 0.25-2 wt. %, calculates as $K_2O$. In various embodiments as otherwise described herein, the catalyst further comprises potassium present in an amount of 0.5-3 wt. %, e.g., in an amount of 0.5-2.75 wt. %, or 0.5-2.5 wt. %, or 0.5-2.25 wt. %, or 0.5-2 wt. %, calculated as $K_2O$.

Notably, the present inventors have determined that relatively low amounts of copper can be used while providing good catalyst activity and stability at high temperatures. In various embodiments as otherwise described herein, the catalyst composition does not include more than 20 wt. % of copper, calculated as CuO. For example, in various embodiments as otherwise described herein, the catalyst composition does not include more than 15 wt. % of copper, calculated as CuO. And in various embodiments, the catalyst composition does not include more than 10 wt. % of copper, calculated as CuO. The present inventors have found that by limiting the amount of copper in the methanol reforming catalyst, the catalyst is able to maintain activity without degrading at high temperatures. Furthermore, the present inventors have found that even with lower amounts of copper present, the catalysts exhibit high methanol conversion and hydrogen selectivity.

As described above, chromium is conventionally used to provide methanol shift catalysts with excellent activity, selectivity and stability at elevated temperatures. However, chromium is toxic and carcinogenic, and thus it is desirable to avoid its use where possible. The present inventors have found that the catalysts of the disclosure exhibit good activity and stability at high temperature, even without the presence of chromium. Thus, in various embodiments as otherwise described herein, the catalyst composition does not include more than 1 wt. % of chromium, calculated as $Cr_2O_3$. For example, in various embodiments as otherwise described herein, the catalyst composition does not include more than 0.5 wt. %, or more than 0.1 wt. %, or more than 0.01 wt. % of chromium, calculated as $Cr_2O_3$.

The catalyst compositions described herein can be substantially made up of oxides of copper, aluminum and zinc. For example, in various embodiments of the catalyst compositions as otherwise described herein, the total amount of oxides of Cu (calculated as CuO), Al (calculated as $Al_2O_3$) and Zn (calculated as ZnO) is at least 90 wt. % of the catalyst composition, e.g., at least 95 wt. %.

The present inventors have also noted that the addition of certain metal species (e.g., as promoters) can be desirable. Accordingly, in various embodiments of the catalyst compositions as otherwise described herein, the total amount of oxides of Cu (calculated as CuO), Al (calculated as $Al_2O_3$) and Zn (calculated as ZnO) and oxides of metal species selected from sodium, potassium, magnesium, calcium, lanthanum, cesium, gallium, barium, and zirconium (all calculated as the most common oxide) is at least 95 wt. % of the catalyst composition, e.g., at least 98 wt. %.

In various embodiments as otherwise described herein, the catalyst composition has a BET surface area in the range of 20-500 $m^2/g$. For example, in various embodiments as otherwise described herein, the catalyst composition has a BET surface area of 20-500 $m^2/g$, e.g., 20-400 $m^2/g$, or 20-300 $m^2/g$, or 20-200 $m^2/g$, or 30-500 $m^2/g$, or 30-400 $m^2/g$, or 30-300 $m^2/g$, or 30-200 $m^2/g$, or 40-500 $m^2/g$, 40-400 $m^2/g$, or 40-300 $m^2/g$, or 40-200 $m^2/g$, or 50-500 $m^2/g$, or 50-400 $m^2/g$, or 50-300 $m^2/g$, or 50-200 $m^2/g$. The person of ordinary skill in the art will use conventional techniques together with the synthesis techniques described herein to provide materials with desirable surface areas.

In various embodiments as otherwise described herein, the catalyst composition has an $N_2$-accessible pore volume of 0.05-1 cc/g. For example, in various embodiments as otherwise described herein, the catalyst composition has an $N_2$-accessible pore volume of 0.05-1.0 cc/g, e.g., 0.05-0.8 cc/g, or 0.05-0.6 cc/g, or 0.05-0.4 cc/g, or 0.05-0.35 cc/g, or 0.1-0.8 cc/g, or 0.1-cc/g, or 0.1-0.4 cc/g, or 0.1-0.35 cc/g, or 0.2-0.8 cc/g, or 0.2-0.6 cc/g, or 0.2-0.4 cc/g, or 0.2-cc/g. The person of ordinary skill in the art will use conventional techniques together with the synthesis techniques described herein to provide materials with desirable pore volumes.

The present inventors have found that coprecipitation techniques can be used to make the copper, zinc and aluminum mixed oxide catalysts of the disclosure. Other techniques such as impregnation can optionally be used to add additional species, for example, those not amenable to coprecipitation. Another aspect of the disclosure is a method of preparing a methanol reforming catalyst composition. The method includes providing an aqueous precursor solution comprising zinc ions, aluminum ions, and copper ions; precipitating a solid catalyst precursor comprising salts of zinc, aluminum and copper from the aqueous precursor solution, and then calcining the solid catalyst precursor to provide the catalyst composition.

As described above, the method includes providing a precursor solution comprising zinc ions, aluminum ions, and copper ions. In various embodiments as described herein, providing the aqueous precursor solution comprises dissolving one or more salts containing zinc ions, aluminum ions, and copper ions in water. For example, in various embodiments as described herein, the one or more salts may be selected from the group consisting of zinc nitrate, zinc sulfate, zinc carbonate, zinc acetate, zinc chloride, zinc bromide, zinc iodine, aluminum nitrate, aluminum sulfate, aluminum carbonate, aluminum acetate, aluminum chloride, aluminum bromide, aluminum iodine, copper nitrate, copper sulfate, copper carbonate, copper acetate, copper chloride, copper iodine, and copper bromide. In various embodiments of the disclosure, the one or more salts containing zinc ions, aluminum ions, and copper ions have the same counterion. In other embodiments as otherwise described herein, the one or more salts containing zinc ions, aluminum ions, and copper ions have different counterions. In particular embodiments of the disclosure as described herein, providing the precursor solution comprises dissolving one or more of zinc nitrate, aluminum nitrate, and copper nitrate in water.

As descried above, the method includes precipitating the solid catalyst precursor from the solution. The precipitation can be effected by bringing the pH of the solution in the range of 5 and 7.5. For example, in various embodiments of the methods as otherwise described herein, the pH of the precursor solution is brought to, e.g. 5-7.2, or 5-7, or 5-6.8, or 5-6.5, or 5-6.2, or 5-6, or 5.5-7.5, of 5.5-7.2, or 5.5-7, or 5.5-6.8, or 5.5-6.5, or 6-7.5, or 6-7.2, or 6-7, or 6.5-7.5, or 6.5-7.2. Such pH range can desirably be maintained throughout the precipitation.

In some embodiments of the methods as otherwise described herein, the precipitation step includes adding a basic solution comprising carbonate ions and hydroxide ions to the aqueous precursor solution. In some embodiments of the methods as otherwise described herein, the basic solution includes sodium carbonate (e.g., 15-35 wt. %, or 20-30 wt. %), and sodium hydroxide (e.g., 5-15 wt. %). Of course, other basic solutions can be used, e.g., using potassium carbonate and/or potassium hydroxide in place of their sodium analogs.

In various embodiments of the methods as otherwise described herein, the temperature of the precursor solution is maintained between 30° C. and 100° C., throughout the precipitation. For example, in various embodiments of the methods as otherwise described herein, the temperature of the precursor solution is maintained in the range of 30-100° C., e.g., between 30-90° C., or 30-80° C., or 40-100° C., or 40-90° C., or 40-80° C., or 50-100° C., or 50-90° C., or 50-80° C., throughout the precipitation.

The person of ordinary skill in the art can select a desired time course for the precipitation. In various embodiments of the methods as otherwise described herein, the precipitation is performed for a time in the range of 0.5-2 hours, e.g., in the range of 0.5-1.5 hours, or 0.5 to 1 hour, or 1-2 hours, or 1-1.5 hours, or 1.5-2 hours. For example, in particular embodiments, the precipitation takes 1 hour. But other times can be used.

As described above, the method includes calcining the solid catalyst precursor. In some embodiments of the methods as otherwise described herein, the method further comprises isolating and washing the solid catalyst precursor before calcining the solid catalyst precursor. Conventional methods can be employed, without particular limitation. The isolation can be by any desirable method to separate the solid precipitate from the liquid solution, e.g., filtration or centrifugation. Washing can be performed by rinsing with deionized water.

In some embodiments of the methods as otherwise described herein, the solid catalyst precursor is aged before calcination, for example, after isolation but before drying. In some embodiments of the methods as otherwise described herein, the solid catalyst precursor is aged for a time within the range of 5 minutes to 1 hour, e.g., in the range of 5 minutes to 45 minutes, or 5 minutes to 30 minutes, or 5 minutes to 15 minutes, or 15 minutes to 1 hour, or 15 minutes to 45 minutes, or 15 minutes to 30 minutes, or 30 minutes to 1 hour, or 30 minutes to 45 minutes, or 45 minutes to 1 hour.

In some embodiments of the methods as otherwise described herein, the solid catalyst precursor is dried before calcination. Here, too, conventional methods can be used, without particular limitation. In some embodiments of the methods as otherwise described herein, the solid catalyst precursor is dried at a temperature within the range of 40° C. to 200° C., for a period of time within the range of 15 min. to 36 hr. But the person of ordinary skill in the art will appreciate that other conditions can be used (e.g., allowing the material to dry under ambient conditions), and that separate drying steps may not be necessary for some samples as water will be removed during initial stages of the heating for calcination.

The material is calcined in order to convert the zinc, aluminum and copper salts of the precipitate substantially to oxide, via treatment with oxygen (typically in air) at high temperature. In various embodiments of the methods as otherwise escribed herein, the temperature of the calcination is in the range of 200-600° C. For example, in various embodiments of the methods as otherwise described herein, the temperature of the calcination is 300-700° C., e.g., 300-650° C., or 300-600° C., or 300-550° C., or 300-500° C., or 350-700° C., or 350-650° C., or 350-600° C., or 350-550° C., or 400-700° C., or 400-650° C., or 400-600° C., or 450-700° C., or 450-650° C., or 500-700° C.

The person of ordinary skill in the art will select a calcination time sufficient to convert precipitate salts substantially to oxides as described above. In some embodiments of the methods as otherwise described herein, the solid catalyst precursor is calcined for a period of time within the range of 5 min. to 24 hr. For example, in various embodiments of the methods as otherwise described herein, the solid catalyst precursor is calcined for a period of time within the range of 5 min. to 12 hr., or 5 min. to 8 hr., or 1 hr. to 24 hr., or 1-12 hr., or 1-8 hr., or 2-24 hr., or 2-12 hr., or 2-8 hr.

As noted above with respect to the various aspects and embodiments of the catalyst compositions of the disclosure, the metal source other than Zn, Al, or Cu (e.g., a Na, K, Mg, Ca, La, Ce, Ge, Ba, or Zr source) may be, for example, a carbonate, nitrate, acetate, formate, oxalate, molybdate, or citrate, or any compound that provides an alkali metal and/or alkaline earth metal to the calcined catalyst composition. Certain of these species can be precipitated together with the zinc, aluminum and copper salts. In other embodiments of the methods as otherwise described herein, the method further comprises providing one or more of sodium, potassium, magnesium, calcium, lanthanum, cesium, gallium, barium, and zirconium, to the composition by an impregnation step. In particular embodiments, the methods as otherwise described herein include providing one or more of potassium and magnesium to the composition by an impregnation step. In various embodiments of the methods as otherwise described herein, the method comprises impregnating the calcined composition by incipient wetness impregnation. For example, in various embodiments of the methods as otherwise described herein, the method comprises impregnating the calcined composition with an aqueous solution of potassium acetate, and calcining the impregnated composition. For example, in various embodiments of the methods as otherwise described herein, the method comprises impregnating the calcined composition with an aqueous solution of magnesium acetate, and calcining the impregnated composition. For example, in various embodiments of the methods as otherwise described herein, the method comprises impregnating the calcined composition with an aqueous solution of potassium acetate and magnesium acetate, and calcining the impregnated composition.

In various embodiments of the methods as otherwise described herein, a calcination step occurs before the impregnation step. In various embodiments of the methods as otherwise described herein, a calcination step occurs after the impregnation step. In various embodiments of the methods as otherwise described herein, a calcination step occurs both before and after the impregnation step. Post-impregnation drying and calcination can be performed, for example, at temperature and time ranges disclosed above for the calcination of the precipitate.

Another aspect of the disclosure provides a catalyst composition (e.g. a methanol reforming catalyst composition) made by the methods as otherwise described herein.

Advantageously, the present inventors have determined that the catalyst compositions disclosed herein can catalyze high-temperature methanol reforming reactions at efficiencies comparable to conventional chromium-containing and copper-containing catalyst materials, and in various embodiments can be operable under a wider range of water-to-methanol ratios and over a broader range of high temperatures relative to conventional catalyst materials. Furthermore, the present inventors have determined that use of such catalyst compositions can catalyze a high-temperature methanol reforming reaction at a high efficiency comparable to conventional high-copper-containing catalyst materials.

The compositions described herein are especially useful in methanol reforming reactions, e.g., performed at relatively high temperatures. As the person of ordinary skill in the art understands, a methanol reforming reaction generally provides hydrogen from methanol, e.g., by converting water and methanol to hydrogen and carbon oxides (desirably mostly carbon dioxide). Accordingly, another aspect of the disclosure is a method for performing a methanol reforming reaction that includes contacting a feed comprising water and methanol with a catalyst composition as described herein under conditions to cause formation of hydrogen and carbon dioxide. The feed can be formed, for example, by the gasification of an organic feedstock such as coal or biomass.

Thus, one embodiment of the disclosure provides a method for performing a methanol reforming reaction, comprising contacting a feed comprising water and methanol with the catalyst composition as otherwise described herein at a temperature of at least 300° C.

The feed desirably has a significant amount of methanol. For example, in various embodiments as otherwise described herein, the feed includes at least 10 mol. % methanol, e.g., at least 20 mol. % methanol. This can provide a significant quantity of hydrogen for use, e.g., in a fuel cell. However, in other embodiments, feeds leaner in methanol can be used, e.g., to remove small amounts of methanol from a feed stream to be used for other purposes.

As described above, the method includes contacting a feed comprising water and methanol with a methanol reforming catalyst composition. In various embodiments of the methods as otherwise described herein, the molar ratio of water to methanol present in the feed is at most 2.5. For example, in certain such embodiment, the molar ratio of water to methanol of the feed is at most 2.4, or at most 2.3, or at most 2.2, or at most 2.1, or at most 2.0. The present inventors have noted that $H_2$ yield can suffer at higher water to methanol ratios. And in various embodiments of the methods as otherwise described herein, the molar ratio of water to methanol present in the feed stream is at least 0.5, e.g., at least 0.6, or at least 0.8, or at least 1. The present inventors have noted that coke formation and related pressure drop in the catalyst bed can be problematic at lower steam:methanol ratios. Accordingly, in various embodiments of the methods as described herein, the feed has a steam:methanol ratio in the range of 0.5-2.5, e.g., 0.5-2.3, or 0.5-2, or 0.5-1.8, or 0.5-1.5, or 0.7-2.5, or 0.7-2.3, or 0.7-2, or 0.7-1.8, or 0.7-1.5, or 1-2.5, or 1-2.3, or 1-2, or 1-1.8, or 1-1.5.

As described above, the method includes contacting a feed at a temperature of at least 300° C. The present inventors have found that the catalysts described herein can be especially useful in such high-temperature methanol reforming processes. In various embodiments of the methods as otherwise described herein, the feed is contacted with the catalyst composition at a temperature of 300-550° C., or 325-550° C., or 350-550° C., or 375-550° C., or 400-550° C., or 425-550° C., or 450-550° C., or 300-525° C., or 325-525° C., or 350-525° C., or 375-525° C., or 400-525° C., or 425-525° C., or 300-500° C., or 325-500° C., or 350-500° C., or 375-500° C., or 400-500° C., or 300-475° C., or 325-475° C., or 350-475° C., or 375475° C., or 300-450° C., or 325-450° C., or 350-450° C., or 300-425° C., or 325-425° C., or 300-400° C.

The contacting of the feed with the catalyst compositions described herein can be conducted in a variety of ways familiar to the person of ordinary skill in the art. Conventional equipment and processes can be used in conjunction with the catalyst compositions of the disclosure to provide beneficial performance. Thus, the catalyst may be contained in one bed within a reactor vessel or divided up among a plurality of beds within a reactor. The reaction system may contain one or more reaction vessels in series. The feed to the reaction zone can flow vertically upwards, or downwards through the catalyst bed in a typical plug flow reactor, or horizontally across the catalyst bed in a radial flow type reactor.

The gas hourly space velocity will depend on a variety of factors, as would be clear to the person of ordinary skill in the art. In various embodiments of the methods as otherwise described herein, the feed is contacted with the catalyst composition at a gas hourly space velocity (GHSV) of 200-30,000 $h^{-1}$. For example, in various embodiments of the methods as otherwise described herein, the feed is contacted with the provided catalyst composition at a gas hourly space velocity in the range of 1000-30,000 $h^{-1}$, or 5,000-30,000 $h^{-1}$, or 10,000-30,000 $h^{-1}$, or 200 $h^{-1}$-20,000 $h^{-1}$, or 1000-20,000 $h^{-1}$, or 5,000-20,000 $h^{-1}$, or 10,000-20,000 $h^{-1}$.

In various embodiments of the methods as otherwise described herein, the feed is contacted with the catalyst composition at a pressure between ambient and 600 psi, e.g., between ambient and 550 psi, or ambient and 500 psi, or ambient and 450 psi, or ambient and 400 psi, or ambient and 350 psi. For example, in various embodiments, the feed contacted with the catalyst composition is at a pressure between 50 psi and 600 psi, or 50 psi and 550 psi, or psi and 500 psi, or 50 psi and 450 psi, or 50 psi and 400 psi, or 50 psi and 350 psi, or 100 psi and 600 psi, or 100 psi and 550 psi, or 100 psi and 500 psi, or 100 psi and 450 psi, or 100 psi and 400 psi, or 100 psi and 35 psi, or 150 psi and 600 psi, or 150 psi and 550 psi, or 150 psi and 500 psi, or 150 psi and 450 psi, or 150 psi and 400 psi, or 150 psi or 350 psi, or 200 psi and 600 psi, or 200 psi and 550 psi, or 200 psi and 500 psi, or 200 psi and 450 psi, or 200 psi and 400 psi, or 200 psi and 350 psi, or 250 psi and 600 psi, or 250 psi and 550 psi, or 250 psi and 500 psi, or 250 psi and 450 psi, or 250 psi and 400 psi, or 250 psi and 350 psi.

The person of ordinary skill in the art will, of course, generally select reaction conditions, e.g., to balance $H_2$ yield, catalyst performance, thermal durability and coke formation. For example, high steam:methanol ratios can cause hydrogen yield to be lower and can thus cause poor performance in a hydrogen fuel cell, while low steam: methanol ratios can cause coke formation and thus result in significant pressure drop in the catalyst bed. Similarly, if the operation pressure is below the ambient pressure, hydrogen yield can be lowered; but high pressures have higher power requirements reducing cost-effectiveness. Temperature, as is well known, plays an important role in catalysis: too low can provide undesirably low conversion, while too hot can damage the catalyst over time. Based on the teachings of the present disclosure, the person of ordinary skill in the art can balance these considerations to provide an effective industrial process.

Desirably, a hydrogen-containing product of the contacting with the catalyst can be conducted to a fuel cell. The hydrogen-containing product is mostly composed of $H_2$, CO, and $CO_2$. In certain embodiments of the disclosure, $H_2$ is present in the hydrogen-containing product in an amount in the range of 60-90% by volume, e.g., in the range of 65-90%, or 65-85%, or 65-80%, or 70-90%, or 70-85%, or 70-80%, or 75-90%, or 75-85%, or 75-80%, by volume. In certain embodiments of the disclosure, CO is present in the hydrogen-containing product an amount in the range of 1-20% by volume, e.g., in the range of 1-15%, or 1-10%, or 1-5%, or 5-20%, or 5-15%, or 5-10%, by volume. In certain embodiments of the disclosure, $CO_2$ is present in the hydrogen-containing product in an amount in the range of 10-40% by volume, e.g., in the range of 15-35%, or 15-30%, or 15-25%, or 20-40%, or 20-35%, or 20-30%, or 25-40%, or 25-35%, or 25-30%, by volume.

EXAMPLES

The Examples that follow are illustrative of specific embodiments of the process of the disclosure, and various uses thereof. They are set forth for explanatory purposes only, and are not to be taken as limiting the scope of the disclosure.

Example 1. Catalyst Preparation

A mixed metal solution was prepared by dissolving 0.723 mol $Zn(NO_3)_2$ solution, mol $Al(NO_3)$ 3 and 0.048 mol $Cu(NO_3)_2$ solution in 500 mL DI water and by maintaining the temperature of the resultant aqueous solution at 50° C. A base solution was prepared by mixing 240 mL of 10% NaOH solution and 960 mL of 25% $Na_2CO_3$ solution and by maintaining the temperature of the resultant aqueous solution at 50° C. Mixing the metal solution and the base solution at 60° C. at a constant pH 6.8 created the desired precipitate, which took 1 h. The obtained precipitate took 30 min to complete aging. The precipitate was then filtered and washed with deionized water before drying at 120° C. The resultant dried material was calcined at 450° C. for two hours to provide catalyst E1.

A mixed metal solution was prepared by dissolving 0.723 mol $Zn(NO_3)_2$ solution, mol $Al(NO_3)$ 3 and 0.109 mol $Cu(NO_3)_2$ solution in 500 mL DI water and by maintaining the temperature of the resultant aqueous solution at 50° C. A base solution was prepared by mixing 240 mL of 10% NaOH solution and 960 mL of 25% $Na_2CO_3$ solution and by maintaining the temperature of the resultant aqueous solution at 50° C. Mixing the metal solution and the base solution at 60° C. at a constant pH 6.8 created the desired precipitate, which took 1 h. The obtained precipitate took 30 min to complete aging. The precipitate was then filtered and washed with deionized water before drying at 120° C. The resultant dried material was calcined at 450° C. for two hours to provide catalyst E2.

A mixed metal solution was prepared by dissolving 0.723 mol $Zn(NO_3)_2$ solution, mol $Al(NO_3)$ 3 and 0.048 mol $Cu(NO_3)_2$ solution in 500 ml DI water and by maintaining the temperature of the resultant aqueous solution at 50° C. A base solution was prepared by mixing 240 mL of 10% NaOH solution and 960 mL of 25% $Na_2CO_3$ solution and by maintaining the temperature of the resultant aqueous solution at 50° C. Mixing the metal solution and the base solution at 60° C. at a constant pH 6.8 created the desired precipitate, which took 1 h. The obtained precipitate took 30 min to complete aging. The precipitate was then filtered and washed with deionized water before drying at 120° C. The resultant dried material was calcined at 450° C. for two hours. A mixed aqueous solution of magnesium acetate and potassium acetate was added by incipient wetness impregnation to add K and Mg as promoters. The material was then dried at 120° C., and calcined at 450° C. for two hours to provide catalyst E3.

A mixed metal solution was prepared by dissolving 0.723 mol $Zn(NO_3)_2$ solution and mol $Al(NO_3)_3$ solution in 500 mL DI water and by maintaining the temperature of the resultant aqueous solution at 50° C. A base solution was prepared by mixing 240 mL of 10% NaOH solution and 960 mL of 25% $Na_2CO_3$ solution and by maintaining the temperature of the resultant aqueous solution at 50° C. Mixing the metal solution and the base solution at 60° C. at a constant pH 6.8 created the desired precipitate, which took 1 h. The obtained precipitate took min to complete aging. The precipitate was then filtered and washed with deionized water before drying at 120° C. The resultant dried material was calcined at 450° C. for two hours to provide comparative catalyst C1.

A mixed metal solution was prepared by dissolving 0.723 mol $Zn(NO_3)_2$ solution, mol $Al(NO_3)_3$ 0.048 mol $Cu(NO_3)_2$ and 0.017 mol $Mg(NO_3)_2$ solution in 500 mL DI water and by maintaining the temperature of the resultant aqueous solution at 50° C. A base solution was prepared by mixing 240 mL of 10% NaOH solution and 960 mL of 25% $Na_2CO_3$ solution and by maintaining the temperature of the resultant aqueous solution at 50° C. Mixing the metal solution and the base solution at 60° C. at a constant pH 9 created the desired precipitate, which took 1 h. The obtained precipitate took 30 min to complete aging. The precipitate was then filtered and washed with deionized water before drying at 120° C. The resultant dried material was calcined at 450° C. for two hours. The material was then dried at 120° C., and calcined at 450° C. for two hours to provide comparative catalyst C2.

A mixed powder was prepared by mixing 80.0 g $Al_2O_3$, 100 g $ZrCO_3$ and 38 g DI-$H_2O$ for 10 min, and subsequently dried at 110° C. for 3 h. The powder was then mixed with 4% graphite to make pellets and followed by calcination at 350° C. to 550° C. for 6 h. A 14% Ni dipping solution was prepared by dissolving $Ni(NO_3)_2 \cdot 6H_2O$ nitrate in DI $H_2O$. The pellets were dipped in Ni solution for 0.5 h, and then dried in oven at 110° C. for 2 h and calcined at 300° C. for 2 h and 500° C. for 4 h with a ramp rate of 5° C./min. The Ni dipping process was repeated 3-4 times until reaching the desired Ni concentration, 25 wt. % Ni supported on $ZrO_2$ and $Al_2O_3$ oxides mixture. The resulting material provided comparative catalyst C3.

Commercial reference samples were also analyzed with XRD to determine their compositions and to use as further comparative catalysts (C4-C7).

TABLE 1

| Catalyst Compositions | | | | | | | | | |
|---|---|---|---|---|---|---|---|---|---|
| | ZnO (wt. %) | $Al_2O_3$ (wt. %) | $Cr_2O_3$ (wt. %) | CuO (wt. %) | NiO (wt. %) | $ZrO_2$ (wt. %) | $Fe_2O_3$ (wt. %) | MgO (wt. %) | $K_2O$ (wt. %) |
| E1 | 67.5 | 28.0 | | 4.5 | | | | | |
| E2 | 63.6 | 26.4 | | 10.0 | | | | | |
| E3 | 66.2 | 27.4 | | 4.4 | | | | 0.8 | 1.2 |
| C1 | 70.7 | 29.3 | | | | | | | |
| C2 | 66.2 | 27.4 | | 4.4 | | | | 0.8 | 1.2 |
| C3 | | 40.2 | | | 31.9 | 27.9 | | | |
| C4 | 68.2 | | 31.8 | | | | | | |
| C5 | | | 8.5 | 2.0 | | | 89.5 | | |
| C6 | 28.2 | 12.8 | | 57.9 | | | | | |
| C7 | 45.6 | 6.8 | | 47.6 | | | | | |

Example 2. Methanol Conversion and Hydrogen Selectivity

Samples prepared in Example 1 were tableted and loaded at 7.25 mL in a tubular reactor (inner diameter=19 mm) for methanol steam reforming at high temperatures. In the testing, a reaction gas containing a steam vapor and methanol (S/M, mol:mol) with a molar ratio of 1:1 was supplied at 300° C. at a GHSV of 3650 $h^{-1}$. GHSV is calculated on the basis of the flow rate of methanol/$H_2O$ feed under the conditions of 1 atm and 25° C. The gas contacts the catalyst bed to form a hydrogen containing gas at 250 psi and >300° C. Two reaction temperatures were tested, 400° C. and 450° C., at a reaction pressure of 250 psi. All tests were completed in 72 hours. Methanol conversion was calculated from the inlet and outlet difference of methanol. The methanol conversion results along with the hydrogen selectivity are presented in Table 2.

TABLE 2

| Methanol Conversion and Hydrogen Selectivity | | | |
|---|---|---|---|
| | MeOH conversion, % | | $H_2$ selectivity % |
| | 400° C. | 450° C. | 400° C. |
| E1 | 93 | >99 | 73 |
| E2 | 97 | >99 | 74 |
| E3 | 98 | >99 | 74 |
| C1 | 86 | 97 | 75 |
| C2 | 64 | 73 | 75 |
| C3 | 90 | 93 | 35 |
| C4 | 92 | 98 | 73 |
| C5 | 62 | 82 | 66 |
| C6 | 96 | 97 | 71 |
| C7 | 96 | >99 | 74 |

The ZnO and $ZnAl_2O_4$ spinel-based catalysts with Cu as the promoter (E1 and E2) outperformed its non-Cu promoted counterpart (C1). E1 and E2 are fairly similar in the activity and selectivity at 450° C., indicating that the addition of extra 5.5% Cu does not lead to significant difference at high temperature reaction conditions. However, higher Cu content in E2 led to a little better activity than E1 at lower temperatures, e.g. 400° C. The methanol conversion of E3 is slightly higher by adding promoters of 0.8% MgO and 1.2% $K_2O$. Like E3, C2 has as the same active composition, but is precipitated at a basic environment pH=9. The resulting catalyst exhibited much reduced activity than its counterpart E3, decreasing methanol conversion by 32% and 26% at 400° C. and 450° C., respectively. The Ni-based catalyst C3 was also prepared and tested for methanol steam reforming. Despite its good activity at the same testing conditions, the selectivity of C3 towards $H_2$ is unacceptable, 35% compared with ~75% from the ZnO and $ZnAl_2O_4$ spinel-based catalysts. Reference C4 is the Zn/Cr catalyst, which has been commonly used for high temperature methanol steam reforming. Its activity and $H_2$ selectivity are both very close to the Cu-promoted ZnO—$ZnAl_2O_4$ catalysts. Reference samples of C6 and C7 are both $CuO/ZnO/Al_2O_3$ catalysts with high loading of CuO. Even though they exhibited remarkable activity at 400° C. and 450° C. under the testing conditions, they deactivated very quickly because of Cu sintering during the extended testing.

Example 3. Effect of Reaction Temperature and Steam/Methanol (S/M) Ratio

Reaction temperature and steam/methanol (S/M) ratio were also studied for the catalysts. The reaction temperature ranges from 330° C. to 500° C. and a reaction pressure of 250 psi. In the testing, a reaction gas containing a steam vapor and methanol was supplied at 300° C. at a GHSV of 3650 $h^{-1}$. All tests were completed in 72 hours. The details of the testing are described in Table 3.

TABLE 3

Methanol Conversion verses Reaction Temperature and S/M Ratio

| | S/M | MeOH conversion, % | | | |
|---|---|---|---|---|---|
| | (mol:mol) | 330° C. | 400° C. | 450° C. | 500° C. |
| E1 | 1.0 | 83 | 93 | 99 | >99 |
| | 0.6 | 82 | 93 | 98 | >99 |
| | 2.0 | 86 | 94 | 98 | >99 |
| C4 | 1.0 | 51 | 92 | 98 | >99 |
| | 0.6 | 53 | 88 | 97 | >99 |
| | 2.0 | 40 | 86 | 98 | >99 |

The $ZnO—ZnAl_2O_4$ catalyst of E1 demonstrated much higher MeOH conversion at 330° C. compared with the chromium-containing reference sample C4. For instance, the conversion is 83% vs. 51% at S/M=1. At higher temperatures such as 400° C. and 450° C., the conversion difference between the two catalysts is very insignificant. Indeed, E1 demonstrated much more consistent methanol conversion over all the temperatures tested. MeOH conversion is typically positively correlated with S/M ratio. This is true for E1. However, C4 exhibited higher MeOH conversion at S/M of 0.6 than at the ratios of 1 and 2. Accordingly, E1 outperforms the chromium-containing catalyst C4 as it provides a more stable and consistent methanol conversion over all S/M and temperatures tested.

Example 4. Methanol Conversion Over Time

Catalyst E1 was tested for methanol steam reforming as a function of time, the results of which are shown in FIG. 1. The reaction was operated for 175 hours continuously at 330° C., 250 psi, and a GHSV of 3650 $h^{-1}$. FIG. 1 exhibited negligible deactivation for methanol conversion, hydrogen selectivity, carbon monoxide selectivity, and carbon dioxide selectivity during the 175 hour continuous operation, indicating its long-term stability, for catalyst E1.

Figure 2:
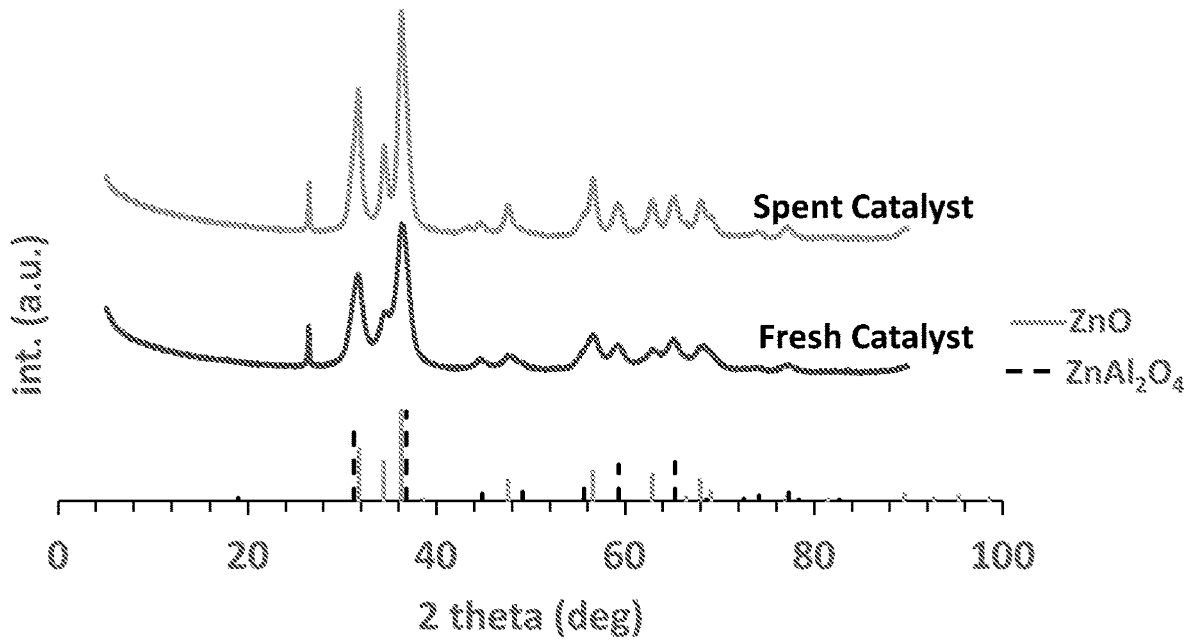
FIG. 2. is a plot of the X-ray diffraction (XRD) patterns of certain materials described herein.

Catalyst E1 demonstrated excellent activity, stability and constant $H_2$ selectivity. Without being bound by theory, its high activity is due to two reasons. One is the oxygen vacancies created by extra $Zn^{2+}$ incorporation into the $ZnAl_2O_4$ lattice, and the other reason is because of the free and highly active ZnO phase. ZnO tends to exhibit higher methanol steam reforming activity than $ZnAl_2O_4$, while the spinel structure of $ZnAl_2O_4$ is known to be thermally stable. Accordingly, the long-term stability and the high methanol conversion of catalyst E1 demonstrated in FIG. 1 is ascribed to both ZnO and $ZnAl_2O_4$ present in the catalyst. In terms of product selectivity, there was 73-74% $H_2$, 1-3% CO and 23-25% $CO_2$ in the dry effluent gas, and no $CH_4$ was detected. Furthermore, as indicated by the XRD data and Rietveld analysis shown in FIG. 2, the spent E1 sample contained higher percentage of $ZnAl_2O_4$, 46.5% compared with 42.9% from fresh sample. Without being bound by theory, it is hypothesized that the phase transformation from ZnO to $ZnAl_2O_4$ during the reaction enabled the catalyst to maintain its high activity at a stable level. The spent catalyst was from a 160 hour run (400° C. for 24 hours and 450° C. for 136 hours) with a GHSV of 3650 $h^{-1}$.

Example 5. Effect of Reaction Pressure and Space Velocities

Various reaction pressure and space velocities were also studied for their impact over the methanol conversion and $H_2$ selectivity, the results of which are shown in Table 4. C5 and C6 indicated a minimal effect of pressure over catalytic activity by varying pressure from 30 psi to 250 psi under the specific testing conditions, 3650 $h^{-1}$ and S/M ratio of 1. At a higher space velocity of 20,000 $h^{-1}$, the methanol conversion for both catalysts dropped tremendously. For example, C5 showed 26% MeOH conversion at 20000 $h^{-1}$ compared with 68% at 3650 $h^{-1}$. And C6 showed 61% vs 95% for the same comparison. Note that the 61% and 65% of MeOH conversion for C6 are the average conversion in the first 24h. The catalyst deactivated very rapidly because of its high CuO content, especially at high space velocities and high temperatures. In general, it is well known that higher space velocity typically results in lower MeOH conversion, while the $H_2$ selectivity remains the same. The other catalysts such as the $ZnO—ZnAl_2O_4$ catalysts demonstrated negligible variation in MeOH conversion and $H_2$ selectivity regarding pressure change at 400° C. and 450° C., 3650 $h^{-1}$, and S/M of 1, the results of which are shown in Table 5. Further, this activity was found to be consistent with no deactivation found in 72 hours of testing under each condition listed in Table 5. The results of Table 4 and 5 demonstrate that the $ZnO—ZnAl_2O_4$ catalyst with substantially less CuO are able to maintain activity without degrading at high temperatures. Furthermore, the $ZnO—ZnAl_2O_4$ catalyst with substantially less CuO (E1, Table 5) show higher methanol conversion and hydrogen selectivity than the catalysts with more CuO (C1 and C2, Table 4).

TABLE 4

Methanol Conversion and Hydrogen Selectivity versus Reaction Conditions

| | Reaction condition | | MeOH | | $H_2$ |
|---|---|---|---|---|---|
| | | Pressure, | conversion, % | | selectivity, % |
| | GHSV, $h^{-1}$ | psi | 400° C. | 450° C. | 400° C. |
| C5 | 3650 | 30 | 68 | 84 | 68 |
| | 3650 | 150 | 67 | 87 | 67 |
| | 3650 | 250 | 62 | 82 | 66 |
| | 20000 | 250 | 26 | 30 | 68 |
| C6 | 3650 | 30 | 93 | 95 | 72 |
| | 3650 | 150 | 95 | 96 | 71 |
| | 3650 | 250 | 96 | 97 | 71 |
| | 20000 | 250 | 61* | 65* | 72 |

*The MeOH conversions of C6 at 20,000 $h^{-1}$ are average numbers in a 24 hour run. The activity decreased 8% and 18% at 400° C. and 450° C. in 24 hours, respectively.

TABLE 5

Methanol Conversion and Hydrogen Selectivity versus Reaction Conditions for $ZnO—ZnAl_2O_4$ Catalysts

| | Reaction condition | | | | | |
|---|---|---|---|---|---|---|
| | GHSV, $h^{-1}$ | Pressure, psi | MeOH conversion, % 400° C. | MeOH conversion, % 450° C. | $H_2$ selectivity, % 400° C. | $H_2$ selectivity, % 450° C. |
| E1 | 3650 | 150 | 92 | 98 | 74 | 73 |

Additional aspects of the disclosure are provided by the following enumerated embodiments, which may be combined in any number and in any combination not logically or technically inconsistent.

Embodiment 1. A methanol reforming catalyst composition comprising:

a ZnO phase, present in the composition in an amount of 20-75 wt. %;

a zinc-aluminum spinel phase, present in the composition in an amount of 20-60 wt. %; and a Cu dopant phase, present in the composition in an amount of 0.1-20 wt. %.

Embodiment 2. The catalyst composition of embodiment 1, wherein the ZnO phase is present in an amount in the range of 30-70 wt. %, or 40-60 wt. %, or 30-50 wt. %.

Embodiment 3. The catalyst composition of any of embodiments 1-2, wherein the ZnO phase has an average crystallite size in the range of 1-50 nm (e.g., 2.5-40 nm, or 5-30 nm).

Embodiment 4. The catalyst composition of any of embodiments 1-3, wherein the zinc-aluminum spinel phase is present in the composition in an amount in the range of 30-60 wt. %, or 40-60 wt. %, or 30-50 wt. %.

Embodiment 5. The catalyst composition of any of embodiments 1-4, wherein the zinc-aluminum spinel phase has an average crystallite size in the range of 1-100 nm (e.g., 2.5-75 nm, or 5-50 nm).

Embodiment 6. The catalyst composition of any of embodiments 1-5, wherein the Cu dopant is present in the composition in an amount of 0.5-15 wt. % (e.g., 1-10 wt. %), calculated as CuO.

Embodiment 7. The catalyst composition of any of embodiments 1-6, further comprising an $Al_2O_3$ phase in an amount up to 5 wt. %, e.g., up to 4 wt. % or up to 3 wt. %, up to 2 wt. %, or up to 1 wt %.

Embodiment 8. The catalyst composition of any of embodiments 1-7, wherein Zn is present in the composition in a total amount of 40-80 wt % (e.g., 50-80 wt. %, or 60-80 wt. %), calculated as ZnO.

Embodiment 9. The catalyst composition of any of embodiments 1-8, wherein Al is present in the composition in a total amount of 20-50 wt. % (e.g., 20-40 wt. %), calculated as $Al_2O_3$.

Embodiment 10. The catalyst composition of any of embodiments 1-9, wherein Cu is present in the composition in a total amount of 0.5-20 wt. % (e.g., 1-15 wt. % or 1-10 wt. %), calculated as CuO.

Embodiment 11. A calcined methanol reforming catalyst composition comprising oxides of Zn, Al, and Cu, wherein:

Zn is present in the composition in a total amount of 40-80 wt % (e.g., 60-80 wt. %), calculated as ZnO;

Al is present in the composition in a total amount of 20-50 wt. % (e.g., 20-40 wt. %), calculated as $Al_2O_3$; and Cu is present in the composition in a total amount of 0.5-25 wt. % (e.g., 1-15 wt. %), calculated as CuO, wherein the catalyst composition comprises at least 20 wt. % (e.g., at least 30 wt. %, or at least 40 wt. %) zinc-aluminum spinel, as determined by XRD and calculated as $ZnAl_2O_4$.

Embodiment 12. The calcined methanol reforming catalyst composition of embodiment 11, as further described by limitations explicitly presented in any of embodiments 1-10.

Embodiment 13. The catalyst composition of any of embodiments 1-12, further comprising one or more of Na, K, Mg, Ca, La, Ce, Ga, Ba and Zr, present in a combined amount of 0.05-20 wt. % (e.g., 0.1-10 wt. %, or 0.5-5 wt. %).

Embodiment 14. The catalyst composition of any of embodiments 1-13, further comprising at least one of Mg, present in an amount of 0.1-2 wt. % (e.g., 0.5-1.5 wt. %), calculated as MgO; and K, present in an amount of 0.25-3 wt. % (e.g., 0.5-2 wt. %), calculated as $K_2O$.

Embodiment 15. The catalyst composition of any of embodiments 1-14, wherein the catalyst composition does not include more than 15 wt. % (e.g., more than 10 wt. %) of copper, calculated as CuO.

Embodiment 16. The catalyst composition of any of embodiments 1-15, wherein the catalyst composition does not include more than 1 wt. % (e.g., more than 0.5, or more than 0.1 wt. %, or more than 0.01 wt. %) of chromium, calculated as $Cr_2O_3$.

Embodiment 17. The catalyst composition of any of embodiments 1-16, wherein the total amount of oxides of Cu (calculated as CuO), Al (calculated as $Al_2O_3$) and Zn (calculated as ZnO) is at least 90 wt. % of the catalyst composition, e.g., at least 95 wt. %.

Embodiment 18. The catalyst composition of any of embodiments 1-17, wherein the total amount of oxides of Cu (calculated as CuO), Al (calculated as $Al_2O_3$) and Zn (calculated as ZnO) and oxides of metal species selected from sodium, potassium, magnesium, calcium, lanthanum, cesium, gallium, barium, and zirconium (all calculated as the most common oxide) is at least 95 wt. % of the catalyst composition, e.g., at least 98 wt. %.

Embodiment 19. The catalyst composition of any of embodiments 1-18, having a BET surface area of 20-500 $m^2/g$ (e.g., 30-400 $m^2/g$, or 50-200 $m^2/g$).

Embodiment 20. The catalyst composition of any of embodiments 1-19, having an $N_2$-accessible pore volume of 0.05-1 cc/g (e.g., 0.1-0.6 cc/g, or 0.2-0.35 cc/g).

Embodiment 21. A method for preparing a methanol reforming catalyst composition according to any of embodiments 1-20, the method comprising providing an aqueous precursor solution comprising zinc ions, aluminum ions, and copper ions;

precipitating a solid catalyst precursor comprising salts of zinc, aluminum and copper from the aqueous precursor solution; and then calcining the solid catalyst precursor to provide the catalyst composition.

Embodiment 22. The method of embodiment 21, wherein providing the precursor solution comprises dissolving one or more of $Zn(NO_3)_2$, $Al(NO_3)_3$, and $Cu(NO_3)_2$ in water.

Embodiment 23. The method of embodiment 21 or embodiment 22, wherein precipitating the solid catalyst precursor comprises bringing the pH of the solution to a range of 5-7.5 (e.g., 6.5-7.2).

Embodiment 24. The method of any of embodiments 21-23, wherein precipitating the solid catalyst precursor comprises adding a basic solution comprising carbonate ions and hydroxide ions to the precursor solution.

Embodiment 25. The method of any of embodiments 21-24, wherein the temperature of the precursor solution is maintained between 30° C. and 100° C. (e.g., between 50° C. and 80° C.) throughout the precipitation.

Embodiment 26. The method of any of embodiments 21-25, further comprising aging, washing, and then drying the solid catalyst precursor before calcining the solid catalyst precursor.

Embodiment 27. The method of any of embodiments 21-26, wherein the temperature of the calcination is 300-700° C. (e.g., 400-600° C.).

Embodiment 28. The method of any of embodiments 21-27, further comprising providing one or more of Na, K, Mg, Ca, La, Ce, Ga, Ba and Zr to the composition by an impregnation step, wherein a calcination is performed after the impregnation step.

Embodiment 29. The method of any of embodiments 21-27, further comprising providing one or more of K and Mg to the composition by an impregnation step, wherein a calcination is performed after the impregnation step.

Embodiment 30. A catalyst composition made by a method of any of embodiments 21-29.

Embodiment 31. A method for performing a methanol reforming reaction, comprising contacting a feed comprising water and methanol with the catalyst composition of any of embodiments 1-20 or 30 at a temperature of at least 300° C. to form hydrogen and carbon dioxide.

Embodiment 32. The method of embodiment 31, wherein the feed comprises at least 10 vol % methanol, e.g., at least 20 vol. % methanol.

Embodiment 33. The method of any of embodiments 31-32, wherein the molar ratio of water to methanol present in the feed is at least 0.5 (e.g., at least 0.6).

Embodiment 34. The method of any of embodiments 31-33, wherein the molar ratio of water to methanol present in the feed is no more than 2.5 (e.g., no more than 2).

Embodiment 35. The method of any of embodiments 31-32, wherein the molar ratio of water to methanol present in the feed is in the range of 0.5-2.5, e.g., 0.5-2.3, or 0.5-2, or 0.5-1.8, or 0.5-1.5, or 0.7-2.5, or 0.7-2.3, or 0.7-2, or 0.7-1.8, or 0.7-1.5, or 1-2.5, or 1-2.3, or 1-2, or 1-1.8, or 1-1.5.

Embodiment 36. The method of any of embodiments 31-35, wherein the feed is contacted with the catalyst composition at a temperature of 300-550° C. (e.g., 325-500° C.).

Embodiment 37. The method of any of embodiments 31-36, wherein the feed is contacted with the catalyst composition at a gas hourly space velocity of 200-30,000 $h^{-1}$.

Embodiment 38. The method of any of embodiments 31-37, wherein the feed is contacted with the catalyst composition at a pressure between ambient and 600 psi (e.g., between ambient and 350 psi).

Embodiment 39. The method of any of embodiments 31-38, further comprising conducting a hydrogen-containing product of the contacting to a fuel cell.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

Thus, before the disclosed processes and devices are described, it is to be understood that the aspects described herein are not limited to specific embodiments, apparatuses, or configurations, and as such can, of course, vary. It is also to be understood that the terminology used herein is for the purpose of describing particular aspects only and, unless specifically defined herein, is not intended to be limiting.

The terms “a,” “an,” “the” and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. It will be further understood that the endpoints of each of the ranges are significant both in relation to the other endpoint, and independently of the other endpoint.

All methods described herein can be performed in any suitable order of steps unless otherwise indicated herein or otherwise clearly contradicted by context. The use of any and all examples, or exemplary language (e.g., “such as”) provided herein is intended merely to better illuminate the invention and does not pose a limitation on the scope of the invention otherwise claimed. No language in the specification should be construed as indicating any non-claimed element essential to the practice of the invention.

Unless the context clearly requires otherwise, throughout the description and the claims, the words ‘comprise’, ‘comprising’, and the like are to be construed in an inclusive sense as opposed to an exclusive or exhaustive sense; that is to say, in the sense of “including, but not limited to”. Words using the singular or plural number also include the plural and singular number, respectively. Additionally, the words “herein,” “above,” and “below” and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term “comprise” or “comprises” means includes, but is not limited to, and allows for the inclusion of unspecified elements, steps, ingredients, or components, even in major amounts. The transitional phrase “consisting of” excludes any element, step, ingredient or component not specified. The transition phrase “consisting essentially of” limits the scope of the embodiment to the specified elements, steps, ingredients or components and to those that do not materially affect the embodiment.

Unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Some embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Numerous references have been made to patents and printed publications throughout this specification. Each of the cited references and printed publications are individually incorporated herein by reference in their entirety.

Furthermore, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

We claim:

1. A methanol reforming catalyst composition comprising:

a ZnO phase, present in the composition in an amount of 20-75 wt. %;

a zinc-aluminum spinel phase, present in the composition in an amount of 20-60 wt. %; and a Cu dopant, present in the composition in an amount of 0.1-20 wt. %, wherein the ZnO phase has an average crystallite size in the range of 1-50 nm.

2. The catalyst composition of claim 1, wherein the ZnO phase is present in an amount in the range of 30-70 wt. %.

3. The catalyst composition of claim 2, wherein the ZnO phase is present in an amount in the range of 40-60 wt. %.

4. The catalyst composition of claim 1, wherein the zinc-aluminum spinel phase is present in the composition in an amount in the range of 30-60 wt %.

5. The catalyst composition of claim 1, wherein the zinc-aluminum spinel phase has an average crystallite size in the range of 1-100 nm.

6. The catalyst composition of claim 1, wherein the Cu dopant is present in the composition in an amount of 0.5-15 wt. %, calculated as CuO.

7. The catalyst composition of claim 1, having an amount of crystalline $Al_2O_3$ that is no more than 5 wt. %.

8. A calcined methanol reforming catalyst composition comprising oxides of Zn, Al, and Cu, wherein:

Zn is present in the composition in a total amount of 40-80 wt %, calculated as ZnO;

Al is present in the composition in a total amount of 20-50 wt. %, calculated as $Al_2O_3$; and Cu is present in the composition in a total amount of 0.5-25 wt. %, calculated as CuO, wherein the catalyst composition comprises at least 20 wt. % zinc-aluminum spinel, as determined by XRD and calculated as $ZnAl_2O_4$.

9. The catalyst composition of claim 1, further comprising at least one of Mg, present in an amount of 0.1-2 wt. %, calculated as MgO; and K, present in an amount of 0.25-3 wt. %, calculated as $K_2O$.

10. The catalyst composition of claim 1, wherein the catalyst composition does not include more than 15 wt. % of copper, calculated as CuO, and does not include more than 1 wt. % of chromium, calculated as $Cr_2O_3$.

11. The catalyst composition of claim 1, wherein the total amount of oxides of Cu (calculated as CuO), Al (calculated as $Al_2O_3$) and Zn (calculated as ZnO) is at least 90 wt. % of the catalyst composition.

12. A method for preparing a methanol reforming catalyst composition according to claim 1, the method comprising providing an aqueous precursor solution comprising zinc ions, aluminum ions, and copper ions;

precipitating a solid catalyst precursor comprising salts of zinc, aluminum and copper from the aqueous precursor solution; and then calcining the solid catalyst precursor to provide the catalyst composition.

13. A method for performing a methanol reforming reaction, comprising contacting a feed comprising water and methanol with the catalyst composition of claim 1 at a temperature of at least 300° C. to form hydrogen and carbon dioxide.

14. The method of claim 13, wherein the feed comprises at least 10 vol % methanol, and wherein the molar ratio of water to methanol present in the feed is in the range of 0.5-2.5.

15. The method of claim 13, further comprising conducting a hydrogen-containing product of the contacting to a fuel cell.

* * * * *